Patented Sept. 18, 1951

2,568,621

UNITED STATES PATENT OFFICE 2,568,621

METHOD FOR PREPARING N-ARYL SUBSTITUTED BETA-AMINO CARBOXYLIC ACIDS

Thomas L. Gresham and Forrest W. Shaver, Akron, Ohio, assignors to The B. F. Goodrich Company, New York, N. Y., a corporation of New York No Drawing. Application June 1, 1950,
Serial No. 165,584

4 Claims. (Cl. 260—518)

This invention relates to a novel method for the preparation of N-aryl substituted beta-amino carboxylic acids, and pertains more particularly to the preparation of such acids by the reaction of primary arylamines with beta-lactones in the presence of an aqueous medium.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

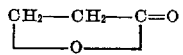

is economically obtained from ketene and formaldehyde.

It has now been discovered that when a saturated aliphatic beta-lactone is reacted with a primary arylamine in aqueous medium reaction occurs at the beta-carbon atom of the beta-lactone to form an N-aryl substituted beta-amino carboxylic acid which possesses the structure

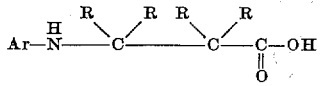

wherein each R is hydrogen or a lower alkyl radical and Ar is an aryl radical having its connecting valence on a nuclear carbon atom. This reaction proceeds substantially according to the following equation:

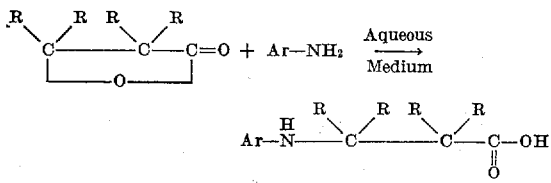

wherein Ar and R have the same significance as above. This reaction affords a convenient and economical method for preparing the N-aryl substituted beta-amino carboxylic acids which are very valuable compounds, being especially useful as intermediates in the preparation of esters, amides, dyestuffs, quinoline type compounds and are useful per se as insecticides, fungicides, medicinals and the like, as well as for multifarious other purposes.

It is highly surprising that primary arylamines will react with beta-lactones in aqueous medium to give an amino acid, since primary aliphatic amines react with beta-lactones in aqueous solution in such a way that the amino nitrogen atom attaches to the carbonyl carbon atom of the beta-lactone to form an amide. This latter reaction is disclosed in a copending application, Serial No. 52,597, filed Oct. 2, 1948, now Patent No. 2,548,155.

Beta-propiolactone is the preferred beta-lactone for use in this process, not only because it is more readily available and more economical in cost than other beta-lactones but also because its use results in the production of highest yields of pure N-aryl substituted beta-amino carboxylic acids. However, other saturated aliphatic beta-lactones which are liquid are also useful in the process, among which are such homologs of beta-propiolactone as beta - butyrolactone, beta-valerolactone, beta - isovalerolactone, alpha-methyl - beta-propiolactone, alpha-ethyl-beta-propiolactone, beta - isopropyl-beta-propiolactone, beta-methyl-beta-valerolactone, and the like, all of which are liquid and possess the general structure

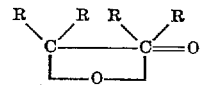

wherein each R is hydrogen or an aykyl group, preferably a lower alkyl group so that the lactone contains from 3 to 6 carbon atoms.

As disclosed hereinabove, the amine which is utilized in this process is a primary arylamine which possesses the structure Ar—NH₂ wherein Ar is an aryl radical having its connecting valences on nuclear carbon atoms. Included among the amines of this class are aniline, o-toluidine, m-toluidine, p-toluidine, 1-naphthylamine, 2-naphthylamine, m-benzylaniline, p-tert-butylaniline, o-ethylaniline, m-ethylaniline, p-ethylaniline, p-isobutylaniline and the like. These amines are representative of the class of primary arylamines but it is to be understood, of course, that other amines of this class are also operative and are included within the scope of the present invention. The especially preferred amines are those in which Ar is a phenyl or a lower alkyl substituted phenyl radical.

No special reaction conditions other than the use of an aqueous medium are necessary in order to carry out the reaction. The quantities of beta-lactone and primary arylamine employed are not critical but it is generally preferred to use equimolecular proportions of the beta-lactone and primary arylamine or a slight excess of the beta-lactone in order to assure that all the amine is reacted with the beta-lactone, thus facilitating subsequent recovery of the desired N-aryl substituted beta-amino carboxylic acid. The presence of a large excess of beta-lactone is of no particular advantage, however, and in fact may be disadvantageous due to the formation of lactone polymer. Sufficient water is utilized to dissolve the reactants and provide an easily stirrable reaction medium.

The reaction is preferably carried out at atmospheric pressure and at a temperature in the range of 0° C. or lower to 100° C. or even higher, and more preferably at 0° C. to 50° C. However, other temperatures and pressures may be used provided the reactants are maintained in a liquid condition during the reaction.

In carrying out the process of this invention it is generally preferable to add the beta-lactone to a mixture of the primary arylamine and water, with continued agitation of the mixture during the addition. However, the amine may be added to a stirred solution of the beta-lactone in water (although relatively high temperatures are generated in this manner of addition) without affecting the fundamental course of the reaction to give an N-aryl substituted beta-amino carboxylic acid, or any other procedure for bringing the reactants together is also effective. In general, the reaction is quite rapid and is complete within a short time after all of the two reactants have been brought into efficient contact with each other. The desired product is preferably recovered by adding the reaction mixture to a solution of sulfuric acid in alcohol and then diluting the alcoholic solution with a water-immiscible solvent such as ether whereupon the N-aryl substituted beta-amino carboxylic acid precipitates as the sulfate. The free acid is obtained by treating the sulfate with an alkali. A second method of recovering the product from the reaction mixture consists in a basic extraction process wherein the reaction mixture is made basic with aqueous alkali, the basic solution extracted with a water-immiscible solvent such as ether and the water extract neutralized with sulfuric acid whereupon an oil separates from which the sulfate of the desired amino acid is obtained by ether extraction and subsequent acidification. However, other conventional methods of separation may also be used without seriously affecting the yield of the product obtained.

The practice of the invention is further illustrated by the following examples in which all parts are by weight.

*Example I*

80 parts (1.1 mole) of beta-propiolactone are slowly added to a solution of 93 parts (1 mole) of aniline in 18 parts of water, the temperature of the reaction mixture being maintained at 20° C. to 30° C. When the addition of the lactone is complete the reaction mixture is heated to 50° C. for an additional one-half hour to assure substantial completion of the reaction. The reaction mixture is then added to a molar equivalent of sulfuric acid in ethanol. Dilution of the alcoholic solution just short of turbidity results in the precipitation of the sulfate of N-phenyl beta-amino propionic acid (M. P. 174°–175° C.). Aqueous alkali is then added to the sulfate whereupon an oil separates which crystallizes on cooling. The solid is filtered and recrystallized from ether by the addition of hexane. A 93% yield of substantially pure N-phenyl beta-amino propionic acid (M. P. 61°–62° C.) is obtained.

*Example II*

Example I is repeated except that o-toluidine is substituted for the aniline. The product is N-(o-toluyl) beta-amino propionic acid and is obtained in good yield, although the yield is not quite so high as that obtained when aniline is utilized.

*Example III*

Example I is repeated except that beta-butyrolactone is substituted for beta-propiolactone. The product is N-phenyl beta-amino butyric acid and is obtained in good yield.

Moreover, when the above examples are repeated utilizing still other of the primary arylamines disclosed hereinabove, for example, naphthylamine, or other beta-lactones, for example, alpha-methyl-beta-propiolactone and alpha, alpha-dimethyl beta-propiolactone, N-aryl substituted beta-amino carboxylic acids are again obtained in substantial yields.

Accordingly, it will be understood that the invention is not intended to be limited to specific embodiments, but only as required by the spirit and scope of the appended claims.

We claim:

1. The method which comprises reacting in aqueous solution a beta-lactone of the structure

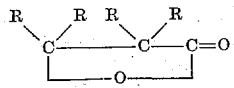

wherein each R is selected from the class consisting of hydrogen and methyl, with an amine of the structure Ar—NH$_2$, wherein Ar is an aryl radical selected from the class consisting of phenyl and methyl substituted phenyl radicals, thereby to obtain solely an acid of the structure

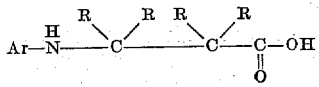

wherein Ar and R have the same significance as above.

2. The method of claim 1 wherein the reaction is carried out at a temperature of from 0° C. to 100° C.

3. The method which comprises reacting in aqueous solution and at a temperature of from 0° C. to 100° C. beta-propiolactone and an amine of the structure Ar—NH$_2$ wherein Ar is an aryl radical selected from the class consisting of phenyl and methyl substituted phenyl radicals, thereby to obtain solely an acid of the structure

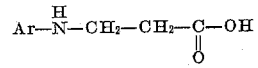

wherein Ar has the same significance as above.

4. The method of claim 3 wherein the amine utilized is aniline and the acid obtained is N-phenyl beta-amino propionic acid.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,502,453 | Gresham et al. | Apr. 4, 1950 |

OTHER REFERENCES

Basler: Ber. Deut. Chem., vol. 17, p. 1503 (1884).

Certificate of Correction

Patent No. 2,568,621 September 18, 1951

THOMAS L. GRESHAM ET AL.

It is hereby certified that error appears in the printed specification of the above numbered patent requiring correction as follows:

Column 2, lines 21 to 24, inclusive, for

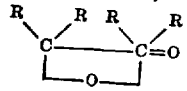 read 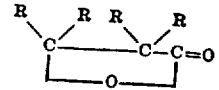

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*